United States Patent [19]

Nahar et al.

[11] Patent Number: 5,208,445
[45] Date of Patent: May 4, 1993

[54] METHOD AND APPARATUS FOR RECEIVING, MARKING AND RETAINING DISCOUNT COUPONS

[75] Inventors: Rathindra Nahar; Barry M. Mergenthaler, both of Cambridge, Ohio

[73] Assignee: NCR Corporation, Dayton, Ohio

[21] Appl. No.: 750,161

[22] Filed: Aug. 26, 1991

[51] Int. Cl.⁵ .................... G06K 15/00; G06F 15/21
[52] U.S. Cl. .................... 235/375; 255/383; 364/401; 194/208
[58] Field of Search ............ 235/375, 383, 432; 364/401; 194/208; 101/235

[56] References Cited

U.S. PATENT DOCUMENTS

| | | | |
|---|---|---|---|
| 2,219,650 | 10/1940 | Helsel | 101/235 |
| 2,934,009 | 4/1960 | Bach et al. | 101/235 |
| 3,587,806 | 6/1971 | Arita . | |
| 3,897,862 | 8/1975 | James . | |
| 3,944,039 | 3/1976 | Houghtaling . | |
| 4,218,011 | 8/1980 | Simjian | 235/375 |
| 4,285,426 | 8/1981 | Cahill . | |
| 4,674,041 | 6/1987 | Lemon et al. | 364/401 |
| 4,723,212 | 2/1988 | Mindrum et al. | 364/401 |
| 4,791,281 | 12/1988 | Johnsen et al. | 235/383 |
| 4,839,507 | 6/1989 | May | 235/487 |
| 4,882,675 | 11/1989 | Nichtberger et al. | 364/401 |
| 4,908,761 | 3/1990 | Tai | 364/401 |
| 4,910,672 | 3/1990 | Off et al. | 364/405 |
| 4,937,742 | 6/1990 | Marshall | 364/401 |
| 4,949,256 | 8/1990 | Humble | 364/401 |
| 4,982,346 | 1/1991 | Girouard et al. | 364/550 |
| 5,008,519 | 4/1991 | Cunningham et al. | 235/383 |
| 5,025,139 | 6/1991 | Halliburton, Jr. | 235/379 |
| 5,091,634 | 2/1992 | Finch et al. | 235/375 |
| 5,128,520 | 7/1992 | Rando et al. | 364/401 |

Primary Examiner—John Shepperd
Attorney, Agent, or Firm—Albert L. Sessler, Jr.

[57] ABSTRACT

A method and apparatus for handling discount coupons includes a scanner, a point of sale terminal and a coupon acceptor. In one embodiment, a coupon file manager is also included. The coupon acceptor receives coupons which have been determined to be genuine and properly related to goods being purchased. The coupons are inserted into an opening in the acceptor and are then drawn into the acceptor by a pair of aligned counter-rotating cylinders. The coupons are also marked within the acceptor to indicate that they have been used. The coupon acceptor provides a secure structure so that coupons cannot be removed therefrom except by an authorized person.

49 Claims, 8 Drawing Sheets

METHOD AND APPARATUS FOR RECEIVING, MARKING AND RETAINING DISCOUNT COUPONS

BACKGROUND OF THE INVENTION

This invention relates generally to systems for handling discount coupons such as are used in connection with the purchase of items from retail supermarkets, and more particularly relates to a method and apparatus for receiving, marking and retaining such discount coupons.

The use of discount coupons in retail marketing, particularly in grocery supermarket operations has become widespread. Coupons have been found by manufacturers and retailers to be an effective competitive tool. Discount coupons may be made available to customers by various means such as being printed in newspapers and magazines, being sent through the mail and being distributed at the store where they are to be used. Handling and accounting for these coupons has become a very real problem however.

There are obviously substantial opportunities for fraud when coupons may be used in place of part of the cash otherwise used to pay for purchased items. Also coupons are normally ultimately redeemed by manufacturers of the goods to which they relate, with reimbursement being made to the stores accepting the coupons. Therefore, providing a precise accounting system for the coupons, and insuring that the coupons have been used only in connection with the specific articles for which they were issued, become extremely important.

Identifying specific coupons and entering information concerning them into data processing systems used by retail establishments is facilitated by printing bar codes on coupons so that they can be scanned by the same type of equipment widely used for scanning bar code labels on merchandise items to be purchased.

Unless the coupons which are received in connection with purchases of related products are marked, mutilated or destroyed, they could conceivably be re-used or fraudulently presented to the manufacturer for improper reimbursement. It is therefore important that proper control be exercised over coupons which are received in the course of a purchase transaction. Marking of coupons which have been used is generally preferable to destruction of the coupons, since in many instances the coupons must be returned to the manufacturer or to a coupon redemption center which handles coupon transactions for one or more manufacturers.

There are several coupon redemption centers in the United States. Such redemption centers contract with retailers either to process used coupons sent to them for a processing fee, or to purchase the coupons from the retailers at an agreed-upon rate, for example such as so much per pound of coupons. These redemption centers maintain an on-going relationship with the manufacturers or issuers of the coupons, and are audited by the issuers on a regular basis. Since the redemption centers have established networks in place with the manufacturers or issuers to redeem very large numbers of used coupons, it is often difficult for a retail establishment or chain economically to justify dealing directly with a manufacturer or issuer of coupons. The system of the retail establishment or chain should preferably therefore be one which handles the coupons in a manner which is compatible with the requirements of the coupon redemption centers.

A system which effectively combines the capability of scanning coupons with means for receiving, marking and retaining such coupons so that they cannot be further used would provide important advantages in facilitating the handling of such coupons, regardless of whether they are returned directly to a manufacturer or issuer, or whether they are sent to a coupon redemption center.

SUMMARY OF THE INVENTION

The present invention employs a coupon acceptor device in a system for receiving, marking and retaining discount coupons of the type used in connection with the purchase of items from retail establishments, such as grocery supermarkets.

In accordance with one aspect of the invention, apparatus for receiving and marking record members comprises a secure structure having a plurality of side walls, and first and second end members; a slot in one of the end members to receive discount coupons; a pair of cooperating, counter-rotating cylinders disposed in the secure structure in proximity to the slot to receive the record member therebetween and transport it past said cylinders into the interior of the secure structure; means for driving the cylinders; and marking means on at least one of said cylinders in the secure structure to mark said record member.

In accordance with another aspect of the invention, a system for utilizing, marking and retaining discount coupons comprises a storage device for receiving, marking and storing discount coupons, said storage device including an input closure which is operable to admit record members which have been determined to be discount coupons and also including a slot, a pair of cooperating counter-rotating cylinders disposed in said storage device in proximity to said slot for transporting a discount coupon inserted into the storage device through said slot, and marking means on at least one of said cylinders to mark said discount coupon; a scanner for scanning encoded data associated with discount coupons to sense data from a record member and to determine whether or not said record member is a discount coupon, said scanner being coupled to said storage device to open the input closure when a discount coupon is sensed, and to transmit data relating to said discount coupon to said storage device; and a point of sale terminal coupled to said storage device to receive said data relating to said sensed discount coupons therefrom to enable the amounts of said discount coupons to be used to reduce the amount charged for purchase of merchandise to which the coupons are related.

In accordance with another aspect of the invention, a method for utilizing, marking and retaining discount coupons in a retail establishment, utilizing a system comprising a scanner, a coupon acceptor having a closure means and cylinder drive means having marking means thereon, and a point of sale terminal, comprises the steps of scanning a record member tendered with a merchandise item by a scanner to decode information coded on the coupons and to determine whether the record member is a proper discount coupon; opening the closure means of the coupon acceptor to enable the coupon acceptor to receive the sensed record member if it is a proper discount coupon; operating the cylinder drive means to drive and mark the coupon after it has been received in the coupon acceptor; and retaining the used coupon in the coupon acceptor.

Accordingly, an object of the present invention is to provide a coupon accepting device capable of accepting a discount coupon, marking said coupon to indicate that it has been used, and retaining the coupon.

Another object is to provide a system for utilizing, marking and retaining discount coupons.

Another object is to provide a system for utilizing, marking and retaining discount coupons, said system including a scanner, a coupon acceptor and a point-of-sale terminal.

Another object is to provide a method for utilizing, marking and retaining discount coupons in a retail establishment.

With these and other objects, which will become apparent from the following description, in view, the invention includes certain novel features of construction and combinations of parts, preferred forms or embodiments of which are hereinafter described with reference to the drawings which accompany and form a part of this specification.

DETAILED DESCRIPTION

Figure 1:
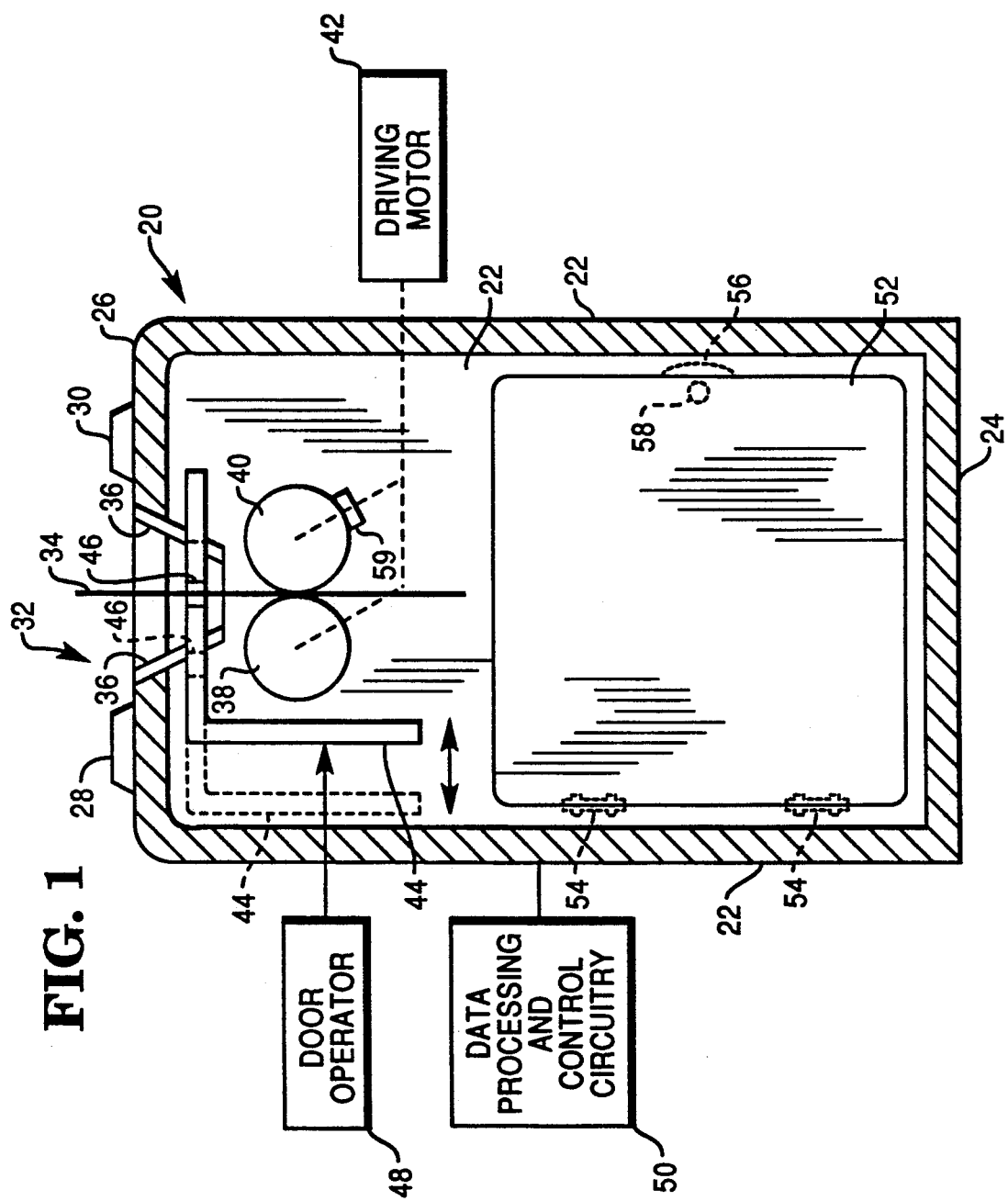
FIG. 1 is a sectional view of a discount coupon acceptor device.

Referring now to FIG. 1, shown there is a sectional view of an illustrated embodiment of a coupon acceptor 20 which comprises four side walls 22, a bottom wall 24 and a top wall 26. A pair of switches 28, 30 may be mounted on the top wall 26, if desired, and may be used for various control purposes. A slot 32 is provided in the top wall 26 to permit discount coupons, such as a discount coupon 34, to be inserted into the coupon acceptor 20. The slot 32 is provided with walls 36 which converge toward the interior of the coupon acceptor 20 in order to facilitate insertion of a coupon 34.

Mounted within the coupon acceptor 20 on parallel axes are a pair of cylinders 38, 40 which are positioned below the slot 32 in line contact with each other so that they are capable of engaging each side of a discount coupon 34 which is inserted through the slot 32 into the interior of the coupon acceptor 20. The cylinders 38, 40 are driven in opposite directions of rotation by a suitable driving means, such as the driving motor 42, so that they grip the coupon 34 therebetween and drive it into the interior of the coupon acceptor 20.

Access to the interior of the coupon acceptor 20 may be blocked by a suitable closure device such as the closure 44 which is mounted for slidable movement within the coupon acceptor 20. The closure 44 is provided with a slot 46 which is positioned beneath the center of the slot 32 when the closure 44 is in the position shown in FIG. 1, so that a coupon 34 may be inserted into the slot to engage the nip of the cylinders 38, 40. The closure 44 may be operated by a door operator 48, such as a solenoid.

When the closure 44 is shifted by the operator 48 to the left, to the dashed line position shown in FIG. 1, the slot 46 is moved out of alignment with the slot 32, and access to the interior of the coupon acceptor 20 is blocked. Operation of the closure 44 and other elements of the coupon acceptor 20 may be controlled by appropriate circuitry, represented by block 50 of FIG. 1. Such circuitry may include a sensing device to determine that a coupon has been properly entered into and received by the coupon acceptor 20.

When coupons 34 are transported to the interior of the acceptor 20, they are retained therein against removal except by authorized persons. Such removal is accomplished by use of a door 52 in one of the side walls of the coupon acceptor 20. The door is mounted on hinges 54, and is provided with a latch 56 and a lock 58, so that it can be opened only by one authorized to do so.

A number of different ways of marking the coupons 34 received in the interior of the coupon acceptor 20 may be employed, if desired. For example, an ink printing device 59 may be attached to one of the cylinders 38, 40, as shown in FIG. 1. Each time that a ticket 34 is moved by the cylinders 38, 40 into the interior of the acceptor 20, it will also be marked with a suitable message, such as "VOID", by the printing device 59, as the cylinder 40 rotates the device into engagement with the ticket 34 being transported.

Figure 8:
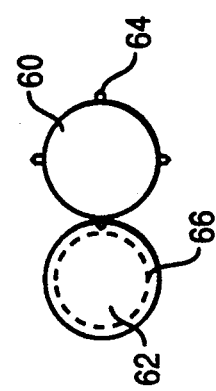
FIG. 8 is a detail view showing a pair of drive cylinders used within the coupon acceptor device, in which one cylinder is provided with projections and the other is provided with cooperating recesses for perforating or embossing a discount coupon passing therebetween.

Alternatively, as shown in FIG. 8, cylinders 60, 62 may be employed in place of the cylinders 38, 40 of FIG. 1. Cylinder 62 is provided with a plurality of projections 64, which engage complementary recesses 66 in the cylinder 62 when the two cylinders are positioned in operative relationship in the coupon acceptor 20. Coupons 34 which pass between and are transported by the cylinders 60, 62 are at the same time perforated or embossed by the projections 64, thus providing a clear indication that such a ticket has been previously used.

Figure 9:
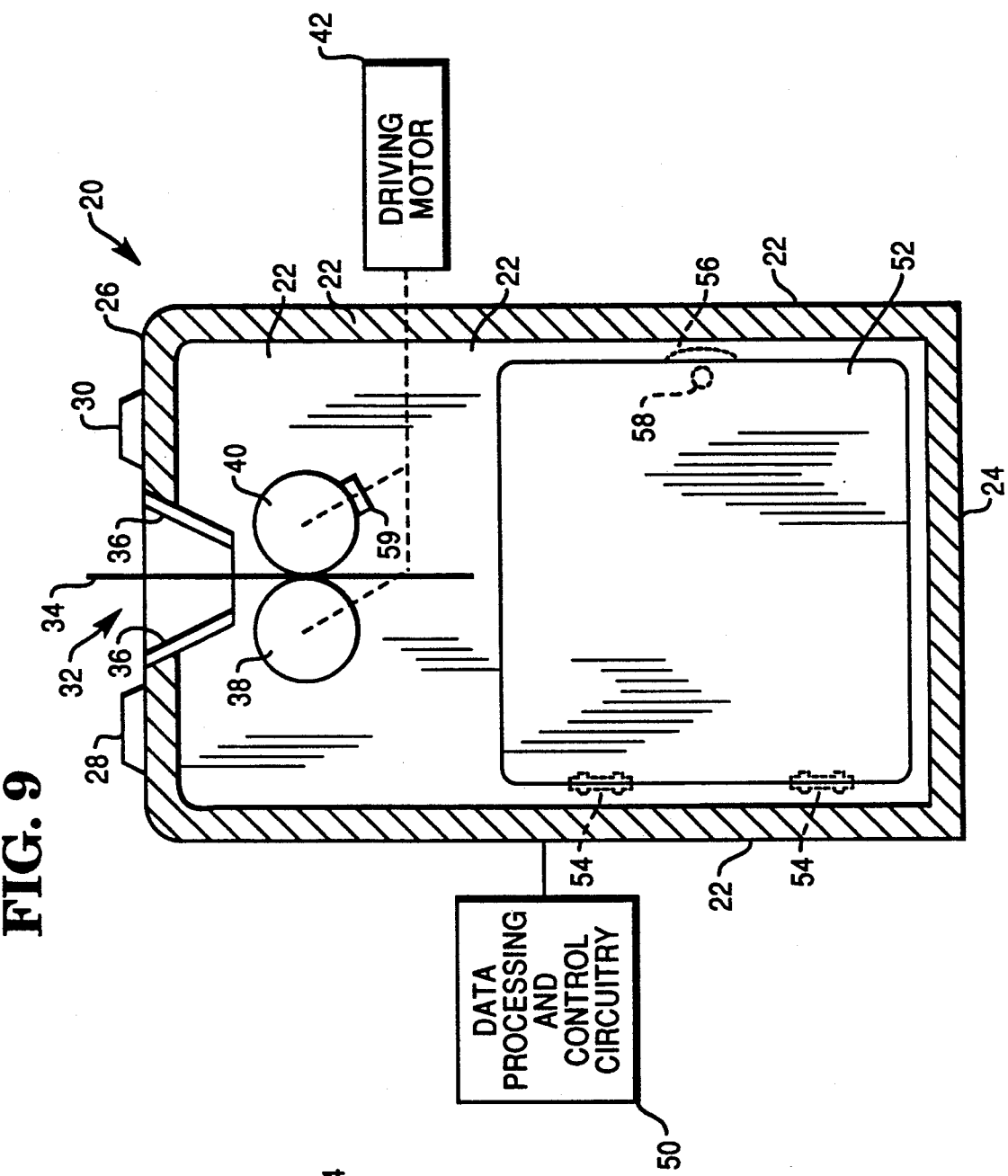
FIG. 9 is a sectional view of a version of the coupon acceptor device shown in FIG. 1, which does not include a closure device that blocks entry of a discount coupon into the interior of the device.

Other variations in the design of the coupon acceptor 20 may also be made. For example, as shown in FIG. 9, the closure 44 and the door operator 48 may be omitted, if desired, in order to reduce costs and simplify the structure. In such a case, the two cylinders 38, 40 serve to block unauthorized entry of coupons 34 into the coupon acceptor 20, since unless these cylinders rotate, they will not permit movement of a ticket 34 past them, and will not transport the ticket 34 into the interior of the coupon acceptor 20. Operation of the driving motor 42 thus controls access to the interior of the coupon acceptor 20.

Figure 10:
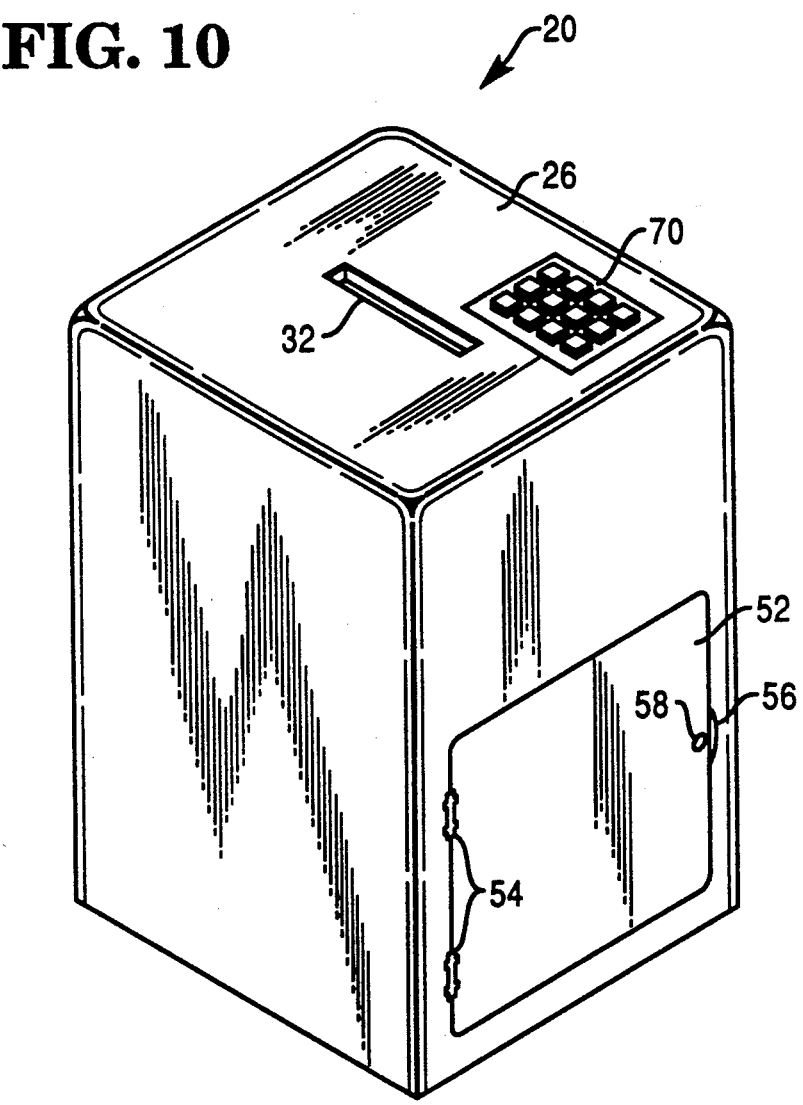
FIG. 10 is a perspective view of a modified form of the coupon acceptor device which has a keypad located on the top surface thereof.
Figure 11:
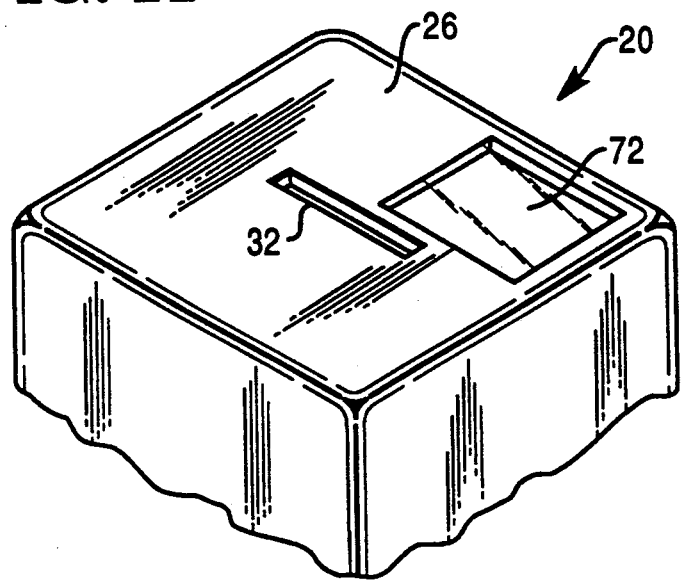
FIG. 11 is a fragmentary perspective view of a modified form of the coupon acceptor device which has a display located on the top surface thereof.
Figure 12:
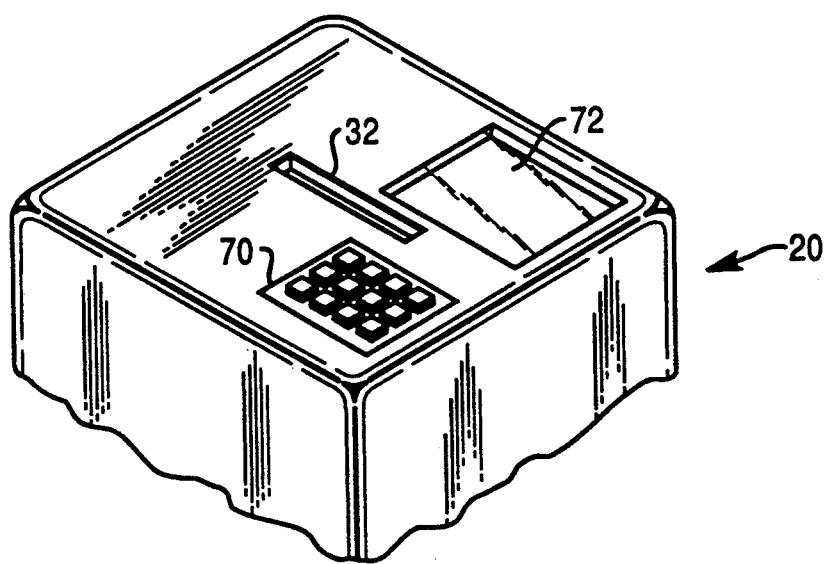
FIG. 12 is a fragmentary perspective view of a modified form of the coupon acceptor device which has both a display and a keypad located on the top surface thereof.

Other features can be added to the coupon acceptor 20, if desired, in order to facilitate its use in certain system applications. For example, as shown in FIG. 10, a keypad 70 may be located on the top wall 26 of the coupon acceptor 20, so that data relating, for example, to identification of the coupon 34 may be manually input into the system in which the coupon acceptor 20 is being used. In the embodiment shown in FIG. 11, a display 72 is shown located on the top wall of the coupon acceptor 20. Such a display could show, for example, coupon data which has been scanned from the coupon 34 by a scanner before the coupon was inserted into the acceptor 20. In the embodiment shown in FIG. 12, both the keypad 70 and the display 72 have been located on the top wall 26 of the coupon acceptor 20.

Figure 2:
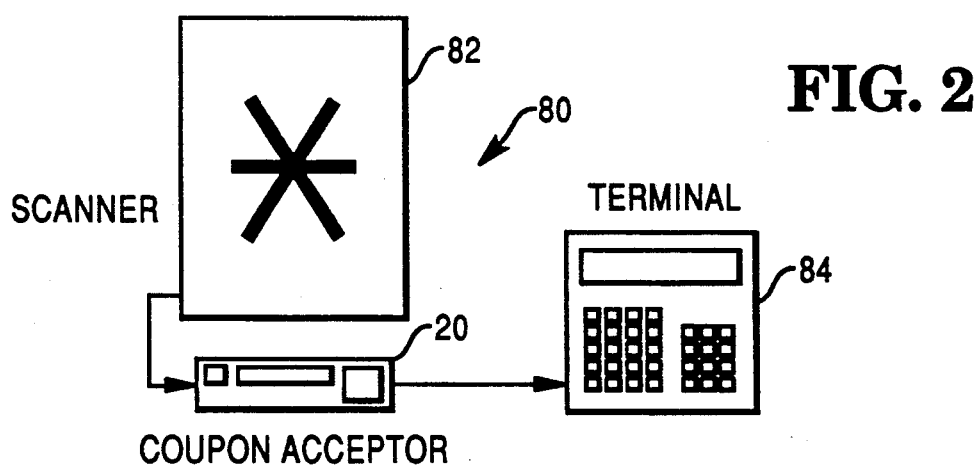
FIG. 2 is a block diagram showing one embodiment of a system for processing discount coupons.

The coupon acceptor 20 is normally used in a system in which the processing of discount coupons 34 is carried o in conjunction with the purchase by a customer of merchandise items to which the coupons relate. One such system 80 is shown in FIG. 2, in which the coupon acceptor 20 is used in conjunction with a scanner 82 and a point of sale terminal 84. The coupon acceptor 20 can either be a stand alone unit or can be physically integrated with another element of the system 80, such as the scanner 82.

Ideally the coupon acceptor 20 is mounted in front of the scanner 80 and is bolted or otherwise secured to a checkout counter or similar structure for space and ergonomical considerations. In the embodiment of FIG. 2, the scanner 82 is electronically coupled to the coupon acceptor 20, which in turn is electronically coupled to the point of sale terminal 84. A process in which this configuration of the system may be used will be subsequently described.

Figure 3:
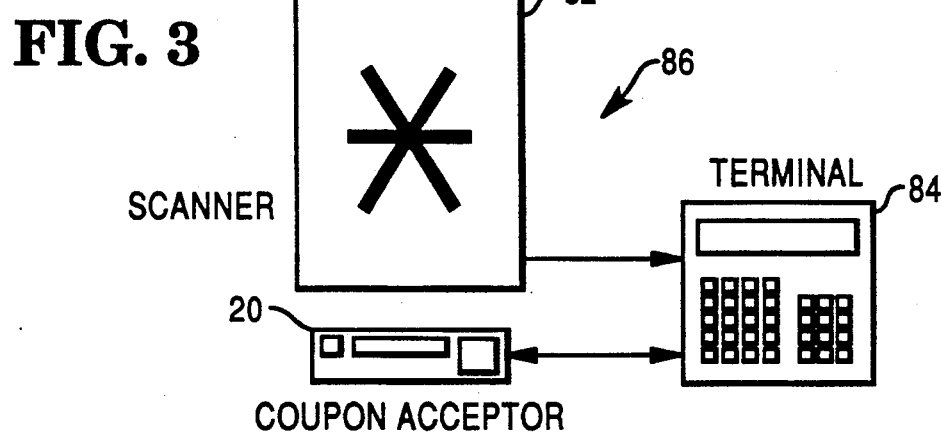
FIG. 3 is a block diagram showing a second embodiment of a system for processing discount coupons.

The system embodiment 86 of FIG. 3 is somewhat similar to that of FIG. 2, and includes the coupon acceptor 20, the scanner 82 and the point of sale terminal 84. However in this embodiment, both the scanner 82 and the coupon acceptor 20 are electronically coupled to the point of sale terminal 84. A process in which this configuration of the system may be used will be subsequently described.

Figure 4:
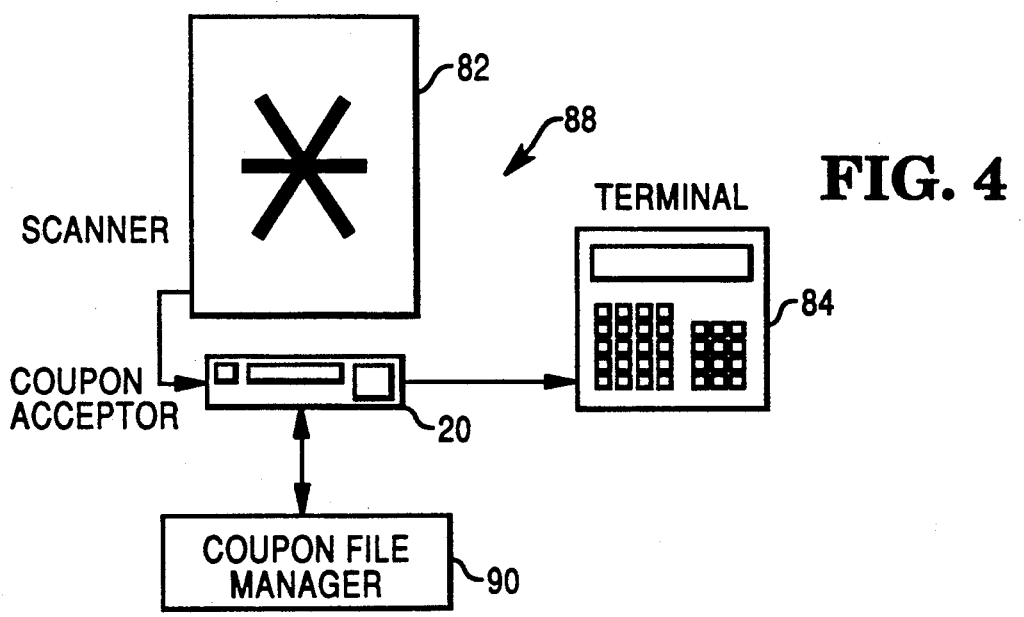
FIG. 4 is a block diagram showing a third embodiment of a system for processing discount coupons.

The system embodiment 88 of FIG. 4 is somewhat similar to that of FIG. 2 and includes the coupon acceptor 20, the scanner 82 and the point of sale terminal 84. Also included in the embodiment of FIG. 4 is a coupon file manager 90. The coupon file manager 90 is a separate processor and memory which provides a file of coupon accounting information vital to the retail establishment.

Coupons being processed can be checked against this file to determine whether the correct merchandise related to the coupon has been purchased. This avoids the need to rely on the terminal for this information, and may avoid the need for costly software changes in the terminal software. One file manager can be used for several terminals. The coupon file manager may be located remotely, or for small systems it may be located inside the coupon acceptor 20. In FIG. 4, it will be seen that the coupon file manager 90 and the scanner 82 are both electronically coupled to the coupon acceptor 20, which in turn is coupled electronically to the point of sale terminal 84. A process in which this configuration of the system may be used will be subsequently described.

Figure 5:
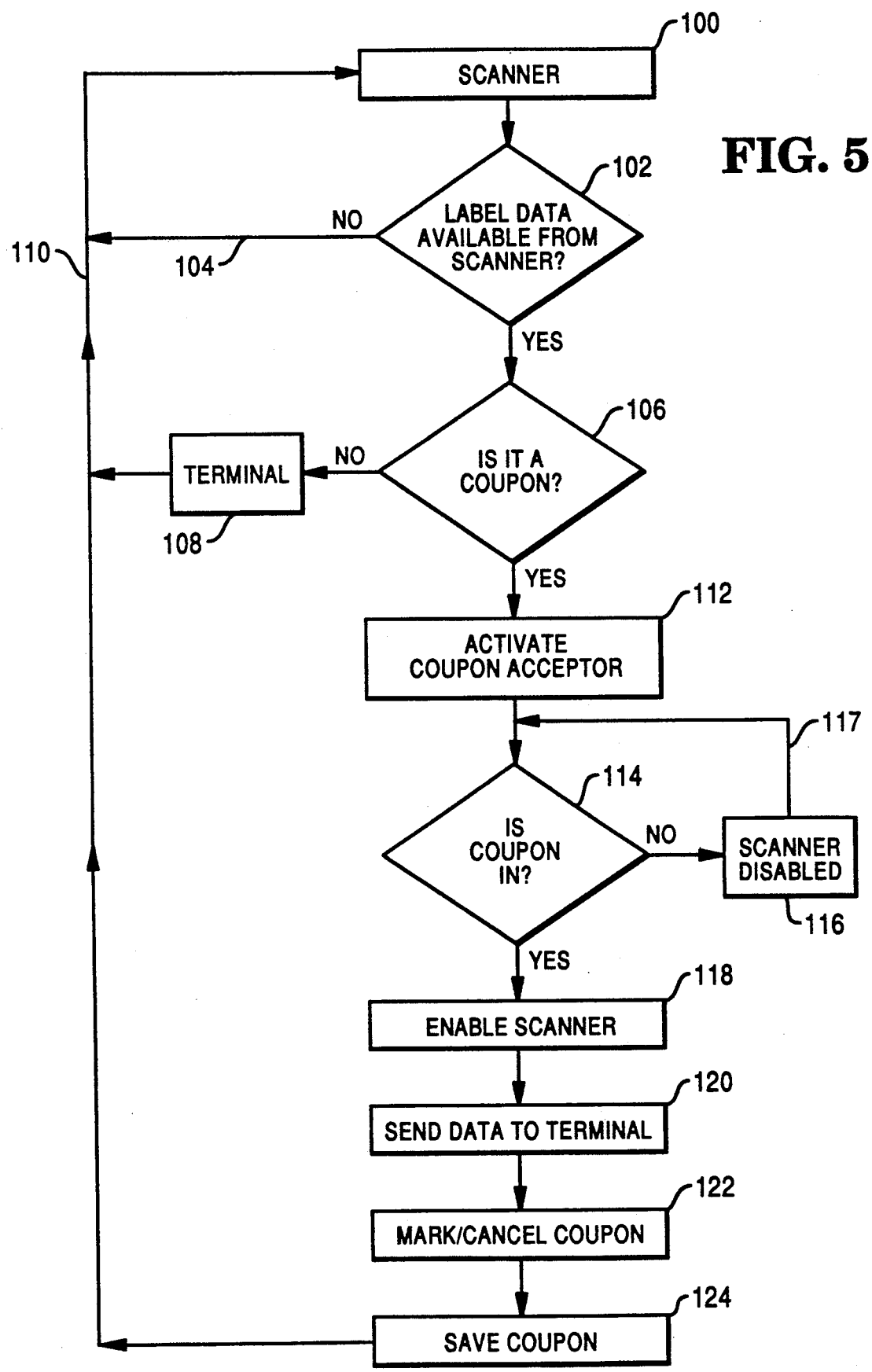
FIG. 5 is a flow diagram of a method for processing discount coupons using the system of FIG. 2.

Returning to the embodiment of FIG. 2, a process in which this system may be employed is shown in FIG. 5. This process commences with block 100, in which a discount coupon 34 is presented to the scanner 82. The scanner scans the coupon and a determination is made in block 102 as to whether or not readable data is available from the scanner. If not, the process returns to block 100 via path 104. If such label data is available, a determination is made in block 106 as to whether or not the item on which the data appears is a discount coupon. If not, the process activates the terminal (block 108), so that the purchase transaction can be carried on using the terminal, after which the process returns via path 110 to block 100. If the item being scanned is determined in block 106 to be a coupon, the coupon acceptor 20 is activated (block 112), so that the coupon can be inserted therein. This may typically involve opening the closure 44 and commencing operation of the motor 42 for driving the cylinders 38, 40.

A determination is then made (block 114) as to whether the coupon has been inserted in the coupon acceptor. Since it is important from the standpoint of coupon security that the coupon be marked and retained after being used, the scanner is disabled (block 116) and the process loops back to block 114 via path 117 until the coupon is properly inserted into the coupon acceptor 20.

When the coupon has been properly inserted into the coupon acceptor 20 and accepted thereby, the scanner is enabled (block 118) and the data from the scanner is sent to the terminal 84 (block 120). The coupon is marked or cancelled within the coupon acceptor, as represented in block 122. If the coupon acceptor is of the type shown in FIG. 1, in which a closure 44 is provided, the closure is closed at this time. After the coupon is marked, it is retained in the coupon acceptor 20, as represented in block 124, and the process returns to block 100 via path 110.

Figure 6:
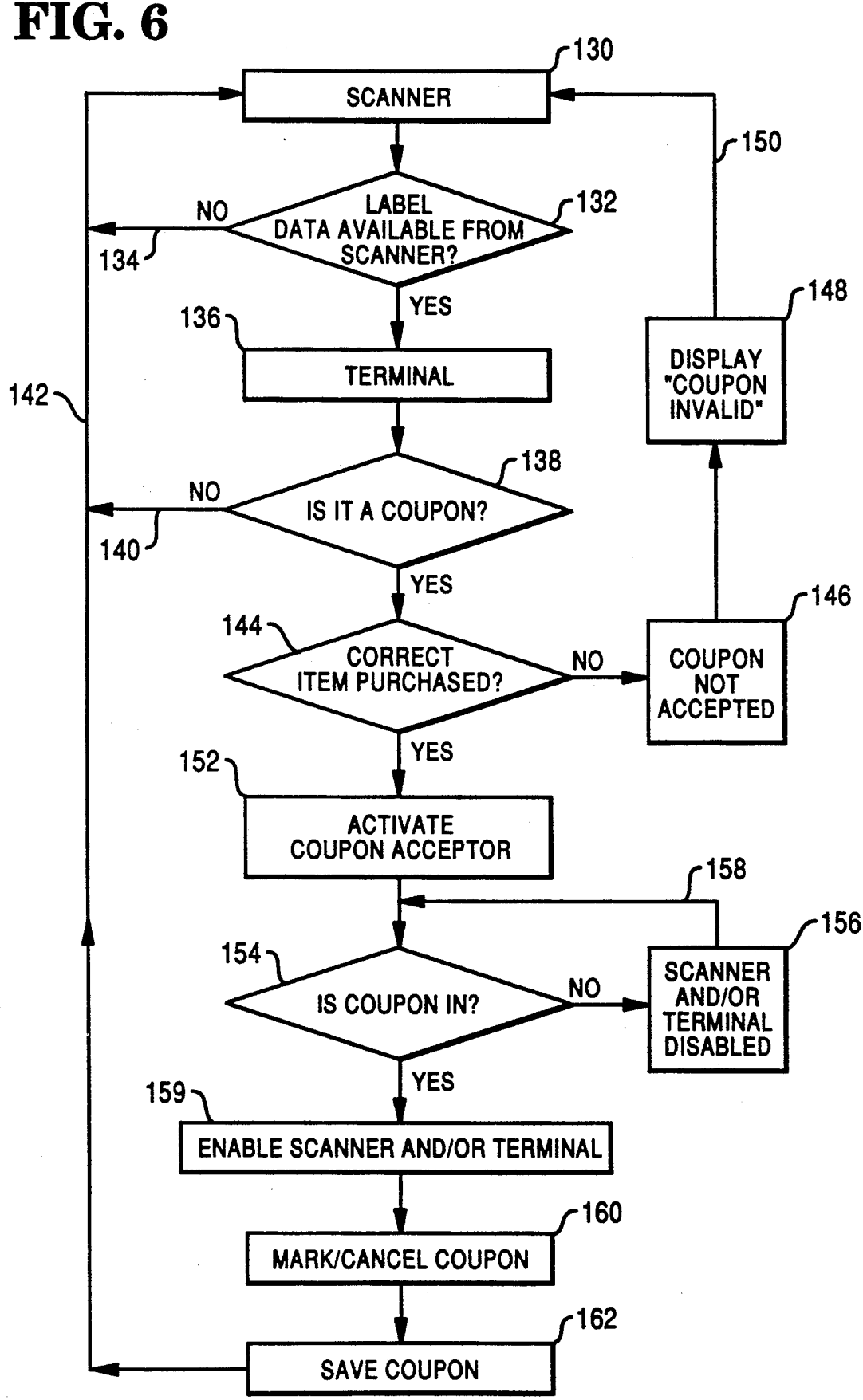
FIG. 6 is a flow diagram of a method for processing discount coupons using the system of FIG. 3.

Returning to the embodiment of FIG. 3, a process in which this system may be used is shown in FIG. 6. This process commences with block 130, in which a discount coupon 34 is presented to the scanner 82. The scanner scans the coupon and a determination is made in block 132 as to whether or not readable data is available from the scanner. If not, the process returns to block 130 via path 134. If such label data is available, it is transmitted to the terminal 84. The terminal then determines whether the data sensed represents a coupon. If not, the process returns to block via paths 140 and 142. If the data sensed does represent a coupon, the process continues to block 144, in which a determination is made by the terminal 84 as to whether or not the correct item corresponding to the coupon has been purchased.

This determination is made after the product for the item has either been scanned or manually input into the terminal 84. If the item purchased does not correspond to the coupon, the coupon will not be accepted by the coupon acceptor (block 146) and a "coupon invalid" indication will appear on a display in the system (block 148). The process will then return to block 130 via path 150.

If the correct item, corresponding to the coupon, has been purchased, the process continues to block 152, in which the coupon acceptor 20 is activated to receive the coupon. This may typically involve opening the closure 44 and commencing operation of the motor 42 for driving the cylinders 38, 40. A determination is then made (block 154) as to whether the coupon has been inserted into the coupon acceptor. If the coupon has not been properly inserted, the scanner and/or the terminal are disabled, as represented by block 156, and the process returns via path 158 to block 154. This loop continues until the coupon is properly inserted.

When the coupon has been properly inserted into the coupon acceptor 20 and accepted thereby, the scanner and/or the terminal are enabled (block 159) for continuation of processing of the transaction. The coupon is marked or cancelled within the coupon acceptor, as represented in block 160. If the coupon acceptor is of the type shown in FIG. 1, in which a closure is provided, the closure is closed at this time. After the coupon is marked, it is retained in the coupon acceptor 20, as represented in block 162, and the process returns to block 130 via path 142.

Figure 7:
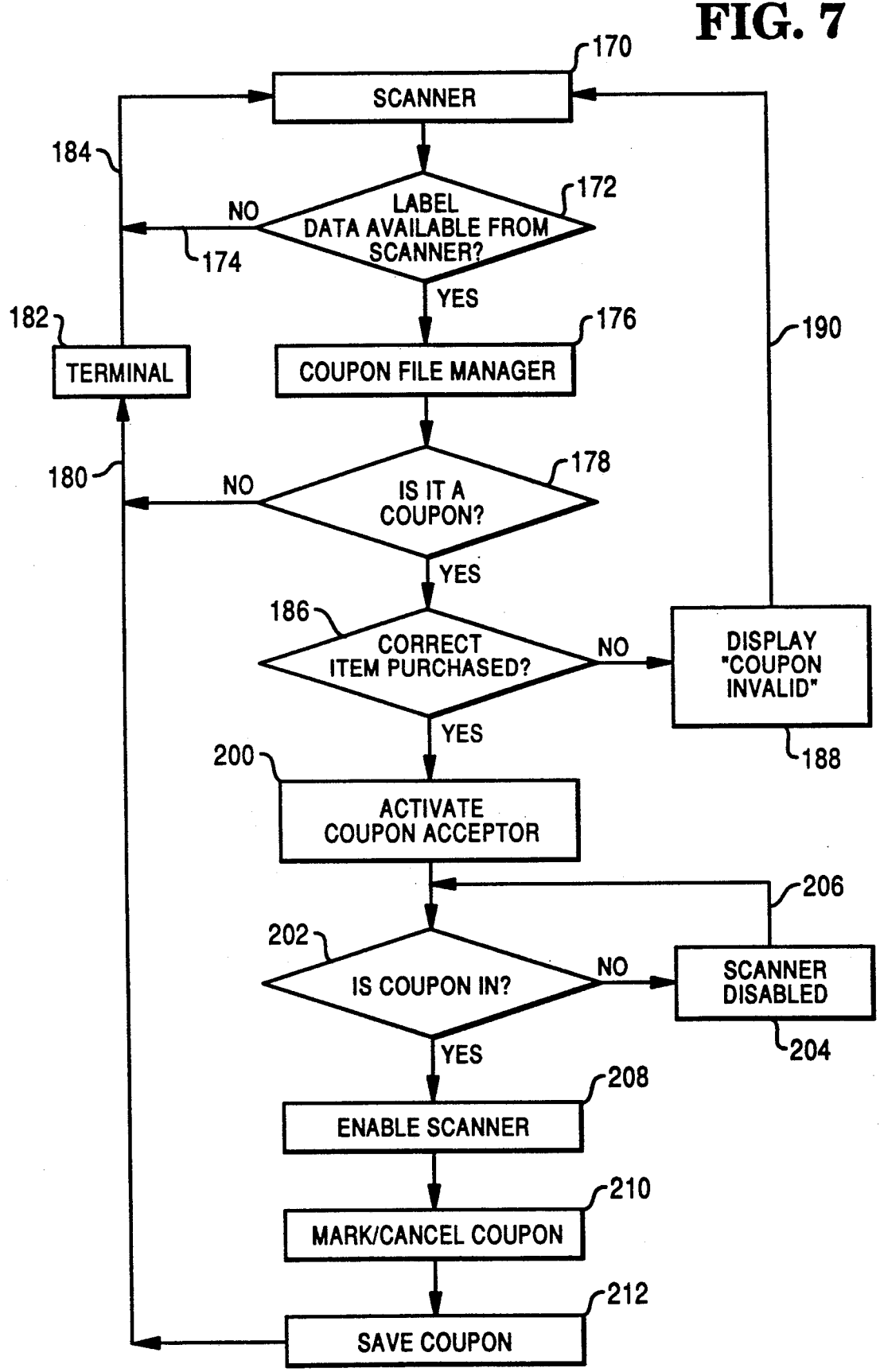
FIG. 7 is a flow diagram of a method for processing discount coupons using the system of FIG. 4.

Returning to the embodiment of FIG. 4, a process in which this system may be employed is shown in FIG. 7. This process commences with block 170, in which a discount coupon 34 is presented to the scanner 82. The scanner scans the coupon and the resulting data is transmitted (block 176) through the coupon acceptor to the coupon file manager 90, where said data is compared (block 178) with coupon data stored in said file to determine whether the data represents a coupon, a record of which is included in the file. If the data does not represent a coupon, the process proceeds via path 180 to activate the terminal (block 182), so that the purchase transaction can be carried on using the terminal, after which the process returns to block 170 via path 184. If the data sensed does represent a coupon, the process continues to block 186, in which a determination is made by the coupon file manager 90 as to whether or not the correct item corresponding to the coupon has been purchased.

This determination is made after the product code for the item has either been scanned or manually input into the terminal 84. If the item purchased does not correspond to the coupon, the coupon will not be accepted by the coupon acceptor and a "coupon invalid" indication will appear on a display in the system (block 188). The process will then return to block 170 via path 190.

If the correct item, corresponding to the coupon, has been purchased, the process continues to block 200, in which the coupon acceptor 20 is activated to receive the coupon. This may typically involve opening the closure 44 and commencing operation of the motor 42 for driving the cylinders 38, 40. A determination is then made (block 202) as to whether the coupon has been inserted into the coupon acceptor. If the coupon has not been properly inserted, the scanner is disabled, as represented by block 204, and the process returns via path 206 to block 202. This loop continues until the coupon is properly inserted.

When the coupon has been properly inserted into the coupon acceptor 20 and accepted thereby, the scanner is enabled (block 208) for continuation of processing of the transaction. The coupon is marked or cancelled within the coupon acceptor, as represented in block 210. If the coupon acceptor is of the type shown in FIG. 1, in which a closure is provided, the closure is closed at this time. After the coupon is marked, it is retained in the coupon acceptor 20, as represented in block 212, and the process returns to block 170 via paths 180 and 184.

While the forms of the invention shown and described herein are admirably adapted to fulfill the objects primarily stated, it is to be understood that it is not intended to confine the invention to the forms or embodiments disclosed herein, for it is susceptible of embodiment in various other forms within the scope of the appended claims.

What is claimed is:

1. Apparatus for receiving and marking record members, comprising:
   a secure structure having a plurality of side walls, and first and second end surfaces;
   a slot in one of said end surfaces to receive record members;
   a pair of cooperating, counter-rotating cylinders disposed in the secure structure in proximity to the slot to receive the record member therebetween and transport it past said cylinders into the interior of the secure structure;
   means for driving said cylinders; and
   marking means on at least one of said cylinders in the secure structure to mark said record member.

2. The apparatus of claim 1, also including a door in one of the side walls to enable coupons to be removed after they have been marked.

3. The apparatus of claim 1, in which said record members are discount coupons.

4. The apparatus of claim 1, in which the marking means comprises an inking means on one of said cylinders.

5. The apparatus of claim 1, in which the marking means comprises at least one projection on one cylinder and at least one cooperating opening on the other cylinder to effect perforation or embossing of the record member as it passes between the cylinders.

6. The apparatus of claim 1, also including a movable barrier interposed between the slot and the cylinders to selectively bar admission of a record member into the secure structure.

7. The apparatus of claim 6, also including operating means for slidably moving the movable barrier to allow entry of a record member into the secure structure.

8. The apparatus of claim 7, in which the operating means is a solenoid.

9. The apparatus of claim 6, in which the movable barrier includes a slot which is interposed in aligned relationship between the slot in the supporting structure and the cooperating cylinders when the movable barrier is positioned to permit entry of a record member into the secure structure.

10. The apparatus of claim 1, also including a throat element having converging walls positioned between said slot and said cooperating cylinders in said secure structure to facilitate movement of a record member through the slot and into engagement with the cooperating cylinders.

11. The apparatus of claim 1, also including first switch means disposed on the exterior of the secure structure for operating the driving means for the cooperating cylinders.

12. The apparatus of claim 7, also including second switch means for operating the operating means for the movable barrier.

13. The apparatus of claim 1, also including a keyboard fixed to the secure structure for entry of data relating to the record member to be received.

14. The apparatus of claim 1, also including a display fixed to the secure structure for display of data relating to the record member to be received.

15. A system for utilizing, marking and retaining discount coupons, comprising:
- a storage device for receiving, marking and storing discount coupons, said storage device including an input closure which is operable to admit record members which have been determined to be discount coupons and also including a slot, a pair of cooperating counter-rotating cylinders disposed in said storage device in proximity to said slot for transporting a discount coupon inserted into the storage device through said slot, and marking means on at least one of said cylinders to mark said discount coupon;
- a scanner for scanning encoded data associated with discount coupons to sense data from a record member and to determine whether or not said record member is a discount coupon, said scanner being coupled to said storage device to open the input closure when a discount coupon is sensed, and to transmit data relating to said discount coupon to said storage device; and
- a point of sale terminal coupled to said storage device to receive said data relating to said sensed discount coupons therefrom to enable the amounts of said discount coupons to be used to reduce the amount charged for purchase of merchandise to which the coupons are related.

16. The system of claim 15, in which said marking means comprises an inking means on one of said cylinders.

17. The system of claim 15, in which said marking means comprises at least one projection on one cylinder and at least one cooperating opening to the other cylinder to effect perforation or embossing of a discount coupon as it passes between the cylinders.

18. The system of claim 15, in which said storage device includes a movable barrier interposed between the slot and the cylinders to selectively bar admission of a discount coupon into the storage device.

19. The system of claim 15, in which said storage device also includes a door to enable the coupons to be removed after they have been marked.

20. A system for utilizing, marking and retaining discount coupons, comprising:
- a scanner for scanning encoded data associated with merchandise to be purchased and with discount coupons for said merchandise;
- a storage device for receiving, marking and storing discount coupons, said storage device including a slot and a pair of cooperating, counter-rotating cylinders disposed in said storage device below said slot for transporting a discount coupon inserted into the storage device through said slot, said storage device also including marking means on at least one of said cylinders for marking discount tickets which have been received; and
- a point of sale terminal coupled to said storage device and to said scanner, to enable the amounts of said discount coupons to be used to reduce the amount charged for purchases of merchandise to which the coupons are related.

21. The system of claim 20, in which said marking means comprises an inking means on one of said cylinders.

22. The system of claim 20, in which said marking means comprises at least one projection on one cylinder and at least one cooperating opening on the other cylinder to effect perforation or embossing of a discount coupon as it passes between the cylinders.

23. The system of claim 20, in which said storage device includes a movable barrier interposed between the slot and the cylinders to selectively bar admission of a discount coupon into the storage device.

24. The system of claim 20, in which said storage device also includes a door to enable the coupons to be removed after they have been marked.

25. A system for utilizing, marking and retaining discount coupons, in a retail establishment, comprising:
- a storage device for receiving, marking and storing discount coupons, said storage device having an input closure which opens to admit record members which have been determined to be discount coupons;
- a scanner for scanning encoded data associated with discount coupons to sense data from a record member and to determine whether or not said record member is a discount coupon, said scanner being coupled to said storage device to open the input closure when a discount coupon is sensed, and to transmit data relating to said discount coupon to said storage device;
- coupon file manager means coupled to said storage device and containing files of data for all merchandise in the retail establishment for checking data from the sensed discount coupons against said merchandise data to determine if data from the sensed discount coupons corresponds to merchandise data; and
- a point of sale terminal coupled to said storage device to receive data relating to discount coupons which has been determined by said coupon file manager means to relate to merchandise in the retail establishment to enable the amounts of said discount coupons to be used to reduce the amount charged for purchase of merchandise to which the coupons are related.

26. The system of claim 25, in which said storage device includes a slot and a pair of cooperating counter-rotating cylinders disposed in said storage device beneath said slot for transporting a discount coupon inserted into the storage device through said slot.

27. The system of claim 25, in which said storage device includes marking means for marking discount coupons which have been received therein.

28. The system of claim 27, in which said marking means comprises an inking means on one of said cylinders.

29. The system of claim 27, in which said marking means comprises at least one projection on one cylinder and at least one cooperating opening on the other cylinder to effect perforation or embossing of a discount coupon as it passes between the cylinders.

30. The system of claim 26, in which said storage device includes a movable barrier interposed between the slot and the cylinders to selectively bar admission of a discount coupon into the storage device.

31. The system of claim 25, in which said storage device also includes a door to enable the coupons to be removed after they have been marked.

32. A method for utilizing, marking and retaining discount coupons in a retail establishment, utilizing a system comprising a scanner, a coupon acceptor and a point of sale terminal, comprising the following steps;

(a) scanning discount coupons tendered with merchandise items by a scanner to decode information coded on the coupons;

(b) determining if coupon data is available from the scanner;

(c) if step (b) is not true, returning to step (a);

(d) if step (b) is true, determining whether the coupon data relates to a discount coupon;

(e) is step (d) is not true, causing coupon data to be manually input by use of a point of sale terminal;

(f) if step (d) is true, activating a coupon acceptor to receive the sensed coupon;

(g) following step (f), determining whether the coupon has been received in the coupon acceptor; (h) if step (g) is not true, disabling the scanner;

(i) if step (g) is true, enabling the scanner to sense merchandise data from a code associated with said merchandise tendered with a discount coupon;

(j) sending scanned data to the point of sale terminal; and (k) retaining the used coupon in the coupon acceptor.

33. The method of claim 32, also including the step of marking the coupon to indicate that it has been used.

34. The method of claim 33, in which the marking of the coupon is accomplished by marking indicia in ink on the coupon.

35. The method of claim 33, in which the marking of the coupon is accomplished by perforating or embossing the coupon.

36. A method for utilizing, marking and retaining discount coupons in a retail establishment, utilizing a system comprising a scanner, a coupon acceptor and a point of sale terminal, comprising the following steps:

(a) scanning discount coupons tendered with merchandise items by a scanner to decode information coded on the coupons;

(b) determining if coupon data is available from the scanner;

(c) if step (b) is not true, returning to step (a);

(d) if step (b) is true, transmitting the decoded coupon data to a point of sale terminal;

(e) determining, in the point of sale terminal, whether the decoded data comprises an acceptable coupon code;

(f) if step (e) is not true, returning to step (a);

(g) if step (e) is true, determining whether the item purchased corresponds to the coupon scanned;

(h) if step (g) is not true, determining that the coupon is not accepted, denying access of the coupon to the coupon acceptor, and providing an indication that the coupon is invalid;

(i) if step (g) is true, providing access to the coupon acceptor to enable the coupon to be placed therein;

(j) determining whether the coupon has been properly placed within the coupon acceptor;

(k) if step (j) is not true, disabling the scanner;

(l) if step (j) is true, enabling the scanner to perform a further scanning operation; and (m) retaining the coupon in the coupon acceptor.

37. The method of claim 36, also including the step of marking the coupon to indicate that it has been used.

38. The method of claim 37, in which the marking of the coupon is accomplished by marking indicia in ink on the coupon.

39. The method of claim 37, in which the marking of the coupon is accomplished by perforating or embossing the coupon.

40. The method of claim 36, in which step (k) also includes disabling the terminal.

41. A method for utilizing, marking and retaining discount coupons in a retail establishment, utilizing a system comprising a scanner, a coupon acceptor, a coupon file manager and a point of sale terminal, comprising the following steps:

(a) scanning discount coupons tendered with merchandise items by a scanner to decode information coded on the coupons;

(b) determining if coupon data is available from the scanner;

(c) if step (b) is not true, returning to step (a);

(d) if step (b) is true, transmitting the decoded coupon data to a coupon file manager;

(e) determining, in the coupon data manager, whether the decoded data comprises an acceptable coupon code;

(f) if step (e) is not true, activating the point of sale terminal for entry of merchandise data not including a discount coupon for processing of a transaction pertaining to the item and then returning to step (a);

(g) if step (e) is true, determining whether the item purchased corresponds to the coupon scanned;

(h) if step (g) is not true, providing an indication that the coupon is invalid and returning to step (a);

(i) if step (g) is true, providing access to the coupon acceptor to enable the coupon to be placed therein;

(j) determining whether the coupon has been properly placed within the coupon acceptor;

(k) if step (j) is not true, disabling the scanner;

(l) if step (j) is true, enabling the scanner to perform a further scanning operation; and (m) retailing the coupon in the coupon acceptor.

42. The method of claim 41, also including the step of marking the coupon to indicate that it has been used.

43. The method of claim 42, in which the marking of the coupon is accomplished by marking indicia in ink on the coupon.

44. The method of claim 42, in which the marking of the coupon is accomplished by perforating or embossing the coupon.

45. A method for utilizing, marking and retaining discount coupons in a retail establishment, utilizing a system comprising a scanner, a coupon acceptor having a closure means and cylinder drive means having marking means thereon, and a point of sale terminal, comprising the following steps:

(a) scanning a record member tendered with a merchandise item by a scanner to decode information coded on the coupons and to determine whether the record member is a proper discount coupon;

(b) opening the closure means of the coupon acceptor to enable the coupon acceptor to receive the sensed record member if it is a proper discount coupon;

(c) operating the cylinder drive means to drive and mark the coupon after it has been received into the coupon acceptor; and (d) retaining the used coupon in the coupon acceptor.

46. The method of claim 45, also including the step of marking the coupon after it has been received in the coupon acceptor.

47. The method of claim 46, in which the marking is accomplished by applying ink to the coupon.

48. The method of claim 46, in which the marking is accomplished by perforating the coupon.

49. The method of claim 46, in which the marking is accomplished by embossing the coupon.

* * * * *

UNITED STATES PATENT AND TRADEMARK OFFICE
CERTIFICATE OF CORRECTION

PATENT NO. : 5,208,445

DATED : May 4, 1993

INVENTOR(S) : Rathindra Nahar et al.

It is certified that error appears in the above-identified patent and that said Letters Patent is hereby corrected as shown below:

Column 9, line 36, change "to" to --on--.

Column 11, line 16, after the ";", --(h)-- should be moved to line 17.

Column 12, line 34, "retailing" should be --retaining--.

Signed and Sealed this

Fourth Day of January, 1994

Attest:

BRUCE LEHMAN

*Attesting Officer*   Commissioner of Patents and Trademarks